July 8, 1947.  E. ACHESON  2,423,748
COLLAPSIBLE TOP FOR VEHICLES
Filed Dec. 2, 1943   3 Sheets-Sheet 1
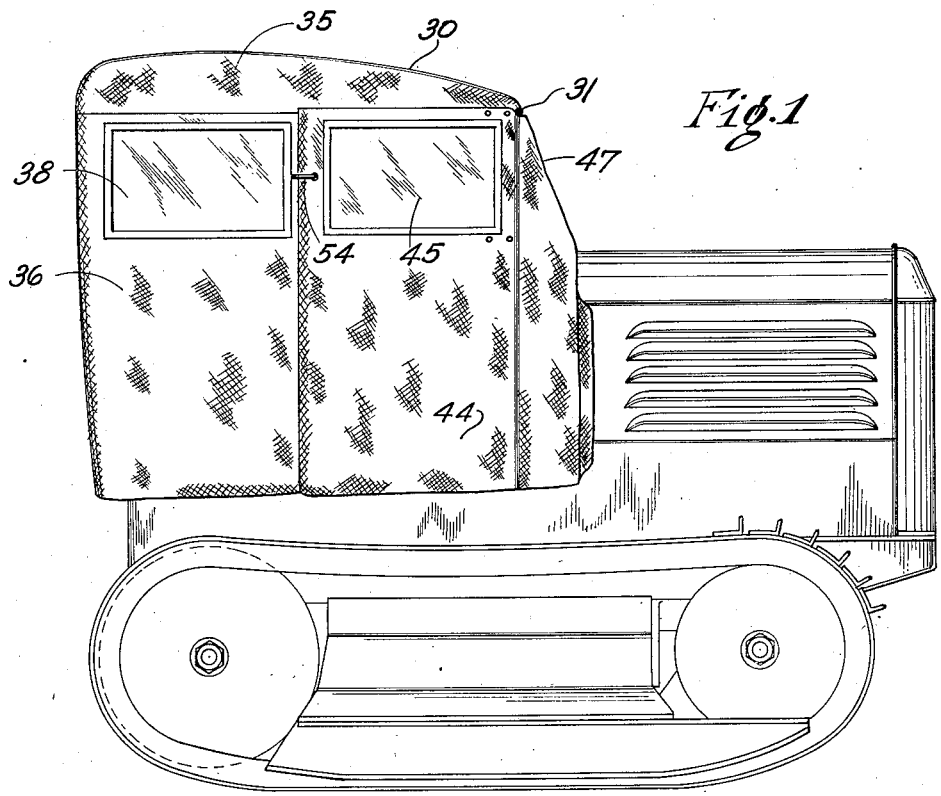
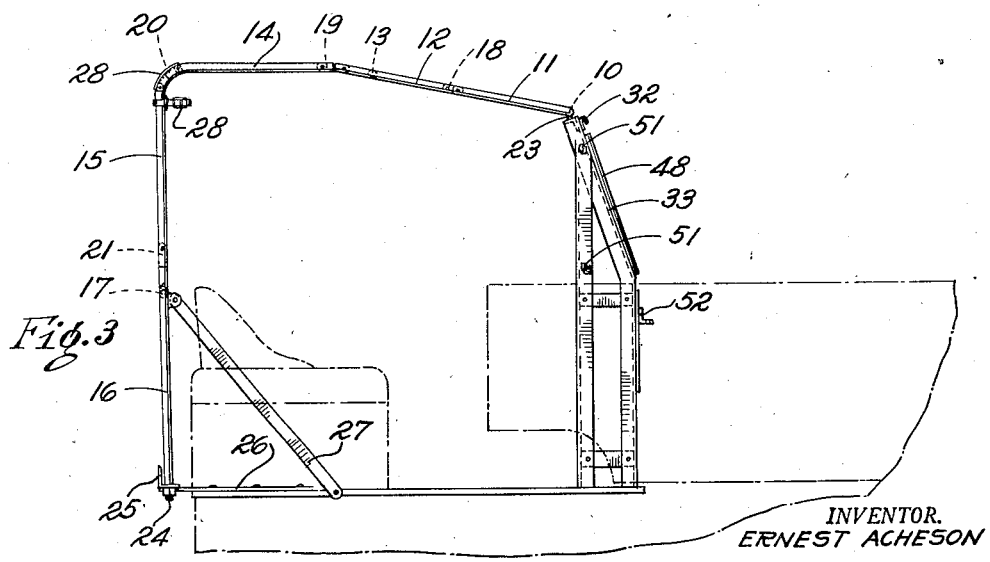
INVENTOR.
ERNEST ACHESON
BY
*Risley & Watts*
ATTORNEYS July 8, 1947. E. ACHESON 2,423,748
COLLAPSIBLE TOP FOR VEHICLES
Filed Dec. 2, 1943 3 Sheets-Sheet 2
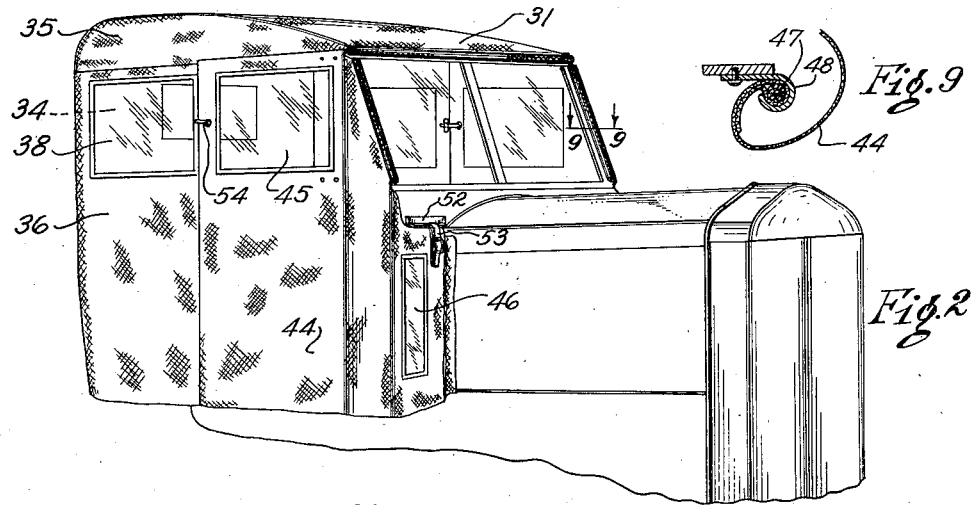
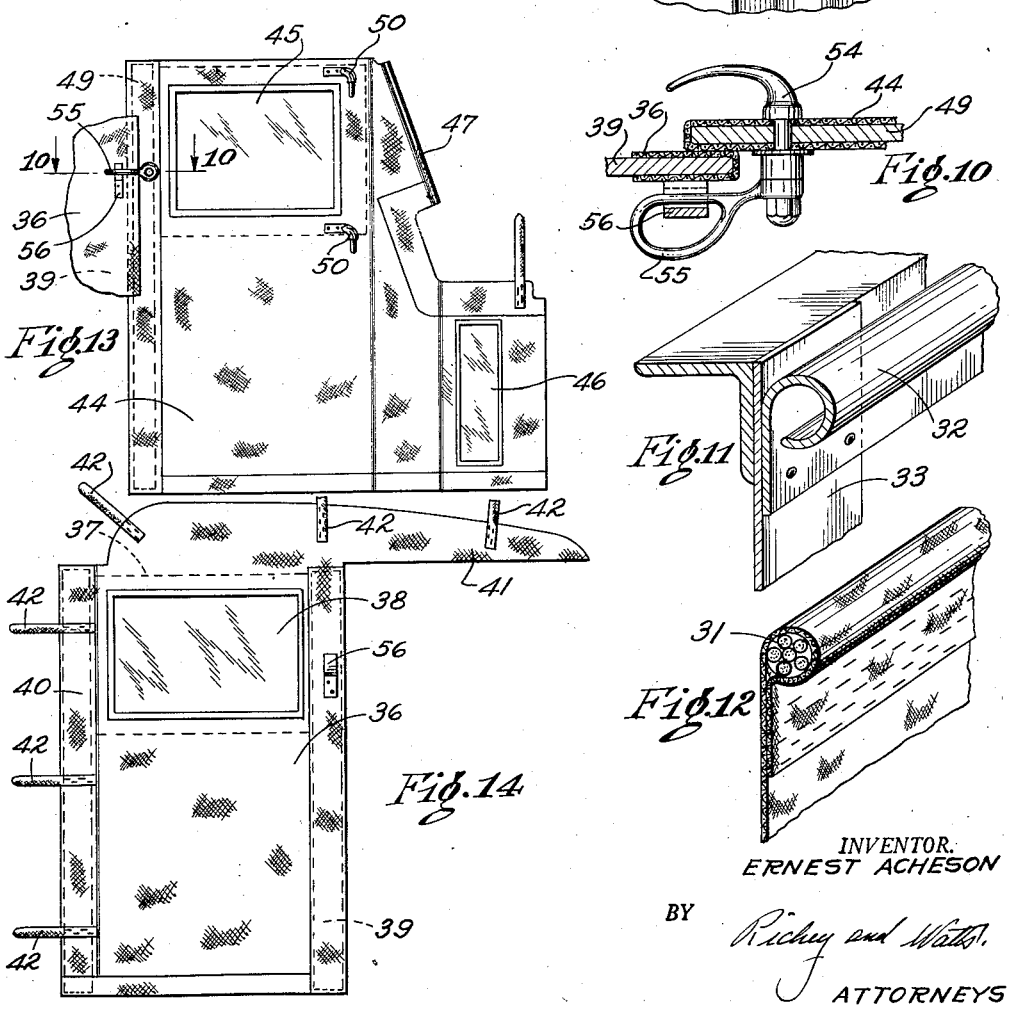
INVENTOR.
ERNEST ACHESON
BY
ATTORNEYS

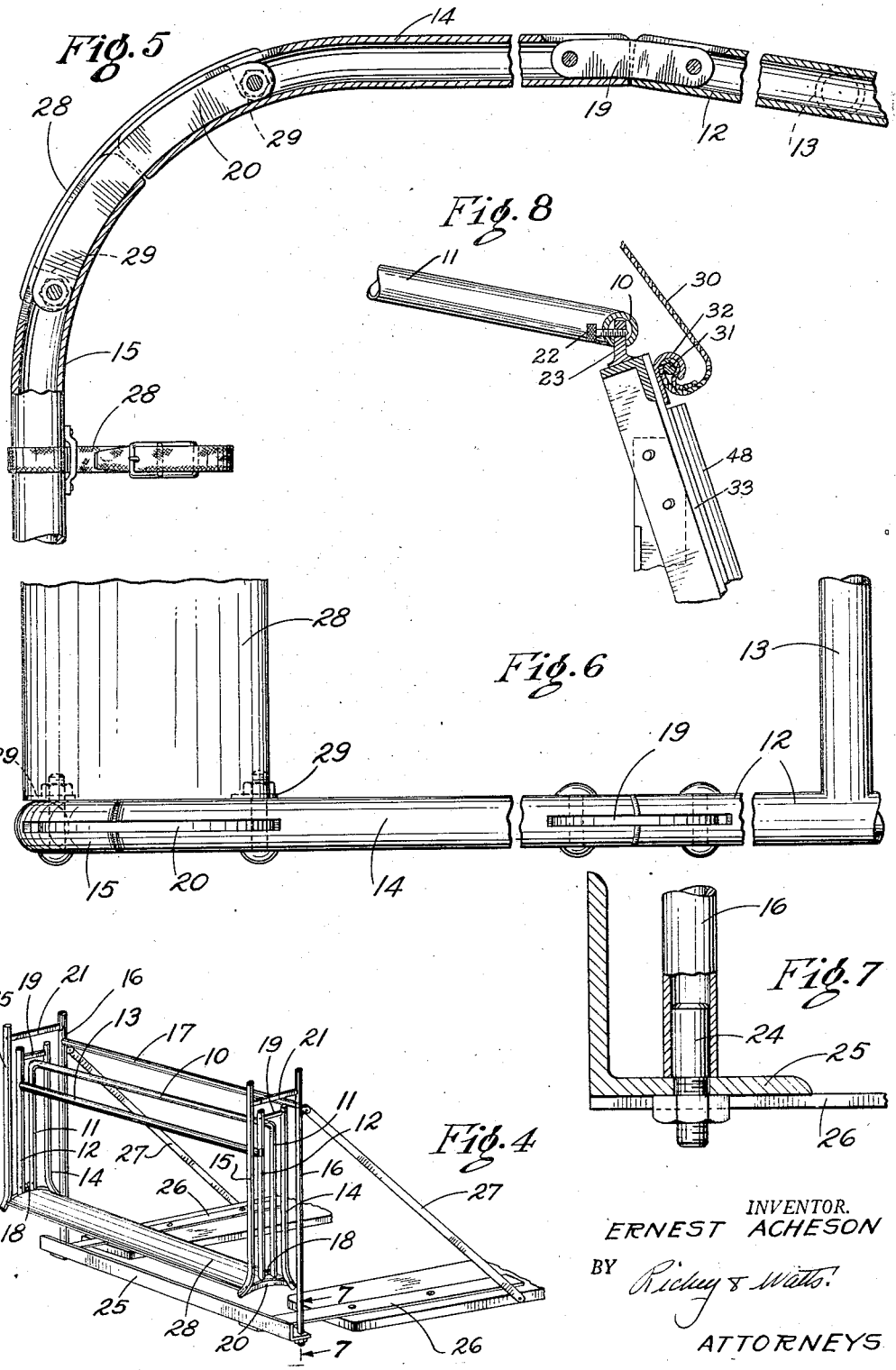

Patented July 8, 1947

2,423,748

UNITED STATES PATENT OFFICE 2,423,748

COLLAPSIBLE TOP FOR VEHICLES

Ernest Acheson, Cleveland, Ohio

Application December 2, 1943, Serial No. 512,536

4 Claims. (Cl. 296—107)

This invention relates broadly to tops for motor propelled vehicles and more specifically to improvements in folding frames and curtains for vehicles such as tractors that are customarily, though not necessarily operated under conditions that demand a clear unrestricted view in every direction.

One of the objects of the invention is to provide a top frame that may be readily mounted upon a vehicle, quickly assembled for use thereon or readily collapsed and dismantled.

Another object of the invention is to construct a top which will afford full freedom of movement and vision when not in use and provide ample protection from the weather when adjusted to its operative position.

Another object of the invention is to provide a top embodying a plurality of detachable curtains which are designed for assembly to provide a complete enclosure for the driver, partial protection against the weather or merely a top covering or canopy.

A further object of the invention is to construct a frame structure from a plurality of hinged sections which are designed to be folded back, one upon the other, and suspended in compact parallel relation depending from the rear of the driver's seat.

Another object of the invention is to provide a removable canvas door structure which may be readily assembled in weather tight relation upon the windshield stanchion or similar supporting member on the vehicle or removed therefrom and folded for storage.

Another object of the invention is to construct a hinge for a tubular frame member which will delimit the movement of the contiguous sections in one direction and accommodate the support thereof in parallel relation with each other when folded.

A still further object of the invention is to provide a frame cross member which is constructed to form a support of arcuate configuration at the rearward upper corner of the top without impingement with other sections of the frame during the folding operation.

Another object of the invention is to provide an articulated frame structure having hinge links therein which are progressively longer in pairs from the forward end of the frame to the base thereof, so that the frame sections when folded will be in contiguous parallel relation with each other.

Another object of the invention is to provide a supporting structure for the frame which will accommodate the removal thereof by merely lifting the assembly from dowels mounted in the vehicle chassis after the side brace couplings are released.

Other objects of the invention reside in a top construction which is sturdy of structure, durable, economic of manufacture and of such a weight as to accommodate single handed manipulation thereof.

Other objects and advantages more or less ancillary to the foregoing and the manner in which all the various objects are realized will appear in the following description, which considered in connection with the accompanying drawings, sets forth the preferred embodiment of the invention.

Referring to the drawings:

Fig. 1 is a side elevation of a tractor embodying the improved top;

Fig. 2 is a view in perspective of the top illustrated in Fig. 1 including a fragmentary portion of the vehicle;

Fig. 3 is a side elevational view of the top frame;

Fig. 4 is a view in perspective of the frame in its folded position;

Fig. 5 is a vertical sectional view of a fragmentary portion of the frame shown in Fig. 3;

Fig. 6 is a plan view thereof;

Fig. 7 is a sectional view of the frame supporting dowel, the section being taken on a plane indicated by the line 7—7 on Fig. 4;

Fig. 8 is a detailed view partially in section of the front supporting stanchion showing the support for the frame cross member and anchorage for the canvas top;

Fig. 9 is a transverse section through the windshield frame illustrating the manner of securement of the upper portion of the door panel, the section being taken on a plane indicated by the line 9—9 on Fig. 2;

Fig. 10 is a transverse section shown upon an enlarged scale of the door panel lock, the section being taken on a plane indicated by the line 10—10 in Fig. 13;

Fig. 11 is an enlarged detail view in perspective and partially in section of the canvas supporting structure illustrated in Fig. 8;

Fig. 12 is a view in perspective and partially in section of a portion of the canvas top, including the edge thereof, that is engaged with the support shown in Fig. 11;

Fig. 13 is an elevational view of the door panel and a fragmentary portion of the contiguous curtain as viewed from the interior of the curtain assembly; and Fig. 14 is an elevational view of the side curtain that forms the enclosure rearward the door panel section.

Referring first to Fig. 3, the improved frame comprises a cross member 10 having the ends thereof bent rearwardly to form the top side sections 11, a pair of intermediate side sections 12 hinged thereto and provided with a cross member 13, a pair of rear top sections 14 hinged to the intermediate sections, rear vertical sections 15 hinged to the sections 14 and to a pair of rear stanchions or uprights 16 united at their upper ends by a cross bar 17.

The frame sections are preferably formed of tubing drilled adjacent their ends for the pivotal support of hinged plates or links mounted within the tubes and guided, during the folding operation, in slots machined in the outer face of the frame sections 11, 12, 14 and 16 (see Figs. 5 and 6). The links for the various sections of the frame are progressively longer than each other, the first link 18 being substantially equal to the diameter of the tube in the forward section 11, the second link 19 being double the length of the link 18, the third link 20 treble the length of the link 18 and curved to the contour of the top corner bend and the fourth link 21 being four times the length of the first link 18, this construction affording arrangement of the sections in parallel spaced adjustment, as shown in Fig. 4.

The forward top section of the frame is attached to the windshield frame or similar stanchion by thumb screws 22 mounted in the cross member 10 and adapted for engagement with apertured lugs 23 welded or otherwise affixed upon the upper face of the transverse rail of the windshield. The lower face of the cross member is slotted for the reentrant engagement of the lugs 23, the slots being of a suitable size to guide the cross member and effect alignment of the screws therein with the openings in the lugs.

The rear of the top frame is supported through the telescopic engagement of the tubular uprights 16 with dowel pins 24 mounted in an angle iron 25 secured to the vehicle frame by plates 26. The uprights are further anchored by brace bars 27 coupled for ready assembly with the vehicle frame and pivotally connected with the uprights adjacent their upper ends.

The top frame may be readily lowered from the position shown in Fig. 3 to the position shown in Fig. 4 by first releasing the thumb screws 22, then folding the sections back upon themselves until the entire structure is collapsed and suspended from the uprights 16 rearward the driver's seat in the vehicle. The assembly may then be held by a strap 28 (Fig. 5) or similar tie, omitted in Fig. 4 in the interest of clarity, mounted on the section 15 and drawn around the grouped sections to prevent undue vibration thereof.

The top and rear panel curtain is formed from a continuous strip of canvas supported by the cross members 10 and 13 and an arcuate plate 28 constituting a cross member at the rearward corner of the top of the frame. The contiguous ends of the sections 14 and 15 and the link 20 are struck from a radius of substantial length (see Fig. 5), the plate 28 following the contour of the frame and being mounted for pivotal movement therewith through ears 29 formed in the ends thereof and drilled for engagement with fulcrums for the link 20.

The canvas top 30 is constructed with a bolt rope 31 in the forward edge thereof adapted for retention in a split tubular rail 32 secured to the top of the windshield stanchion 33. In assembly the lateral edge of the canvas is laced through the slot in the rail with the bolt rope encompassed thereby. The top including the portion constituting the rear curtain 34 is then drawn over the cross members of the frame and strapped or otherwise secured to the angle iron 25, the valance 35 being adjusted, during this operation, to depend from the top frame sections 11, 12, and 14.

The side panels 36 (Fig. 14) comprise a canvas body having a metallic frame 37 therein for the support of a transparent material constituting a window 38, a metal strip 39 secured in a pocket on the forward edge thereof to reinforce the wall defining the door opening, a flap 40 for sealing the opening between the overlying edges of the rear curtain 34 and a forwardly extended header 41 forming a closure between the overlapping portion of the door and valance 35. The top and rear edges of the panel are provided with straps 42 to facilitate the securement of the panel to the top frame sections and rear curtain 34.

The door section 44 (Fig. 13) comprises a canvas body having windows 45 and 46 therein similar in structure to the window 38 in the side panel, a bolt rope 47 in the forward edge of the upper portion thereof for retention within a track or rail 48 in the windshield stanchion 33, a metal plate or strip 49 in the rearward edge thereof and a pair of pintles 50 riveted to one of the window frame reinforcing strips for securement within sockets 51 secured to the rearward vertical frame member of the windshield stanchion 33. The forward end of the door panel is supported by a strap laced through a slot in an angle iron 52 attached to the front panel of the vehicle subjacent the windshield and secured by a buckle 53 mounted on the outer face of the door section. The window 46 in the present embodiment is provided for a view of the forward end of the track during operation of the vehicle. Obviously a window of this character may not be required when the improved top is used in combination with other types of vehicles or in different environs.

The door is retained in its closed position by a handle mounted for rotative movement in the metal strip 49 adjacent the window 45. The handle is formed with a hand grip 54 on the outer wall of the door and a looped grip 55 on the interior thereof, the loop being designed for engagement with a hook or keeper 56 riveted to the strip 39 in the side panel 36.

It will be readily recognized that the canvas wall adjacent the pintles 50 will be slackened during the outward movement of the door and drawn taut when the door is closed, thus forming a smooth tight enclosure. It will be further noted that the door panel may be readily removed by releasing the buckle 53, lifting the section upwardly to relieve the pintles 50 from their seated engagement within the sockets 51, then drawing the bolt rope 47 from the rail 48.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. In a vehicle embodying a windshield stanchion, a demountable top therefor comprising an articulated frame, a canvas top, a bolt rope in the forward edge thereof, a tube having a slot therein throughout the length of the lower face thereof mounted on said stanchion, the diameter of said bolt rope and the encircling portion of the canvas top being smaller than the inside diameter of said tube, the width of said slot in the tube being approximately the thickness of the canvas top, said tube being straight and open at both ends, whereby an end of said bolt rope may be entered into said tube and drawn longitudinally therethrough to effect the securement of said top upon said stanchion.

2. A vehicular top frame comprising a plurality of tubular top sections and rear upright sections, links pivotally connecting the contiguous ends of said sections, the walls of said sections adjacent said links having slots therein for the reentrant engagement of the links, the walls of the sections below said slots defining abutments to arrest movement of the sections in one direction relative to the links, an arcuate top corner plate mounted between the upright section and the contiguous top section, ears on said plate pivotally connected with said sections, the portion of the plate intermediate the pivotal connections being engaged with the sections to arrest movement thereof in one direction relative to the plate.

3. A demountable top for a vehicle comprising a frame, a plurality of tubular sections therein having slots in the ends thereof, links in said slots, pivot pins in the ends thereof supported in said tubular sections, cross members connecting certain of the opposed sections, an arcuate plate forming the cross member at the rear corner of the frame, ears on said plate engaged in the slots in the contiguous frame sections, pivot pins therein supported in said tubular sections, the body of the links and arcuate plate intermediate said pivot pins being engaged with the walls of the tubular sections opposite said slots, whereby said frame is supported against collapse in one direction when the links and plate are adjusted in coaxial relation with the section.

4. In combination with a vehicle having a fixed windshield stanchion and a driver's seat, a top for said vehicle comprising a collapsible frame, horizontal and vertical frame sections therein pivoted in end to end relation with each other, links in said sections, said horizontal sections and certain of the vertical sections being suspended by said links in the lower vertical section when folded, all of said sections being disposed below the top of the driver's seat when the frame is folded, means for supporting said sections in parallel spaced, folded relation and means for the support of the horizontal sections in a common plane when folded in their operative position.

ERNEST ACHESON.

REFERENCES CITED

The following references are of record in the file of this patent:

UNITED STATES PATENTS

| Number | Name | Date |
| --- | --- | --- |
| 1,952,818 | Newton, Jr. | Mar. 27, 1934 |
| 1,080,812 | Cretors | Dec. 9, 1913 |
| 1,298,836 | Vetter | Apr. 1, 1919 |
| 1,236,207 | Oliver | Aug. 7, 1917 |
| 960,338 | Keil et al. | June 7, 1910 |
| 2,267,227 | Williams | Dec. 23, 1941 |
| 1,788,940 | Barker | Jan. 13, 1931 |
| 981,771 | Kretz | Jan. 17, 1911 |
| 1,266,504 | Lloyd et al. | May 14, 1918 |